A. A. WELLS.
OIL HARDENING PROCESS.
APPLICATION FILED JAN. 11, 1918.
1,383,887.
Patented July 5, 1921.
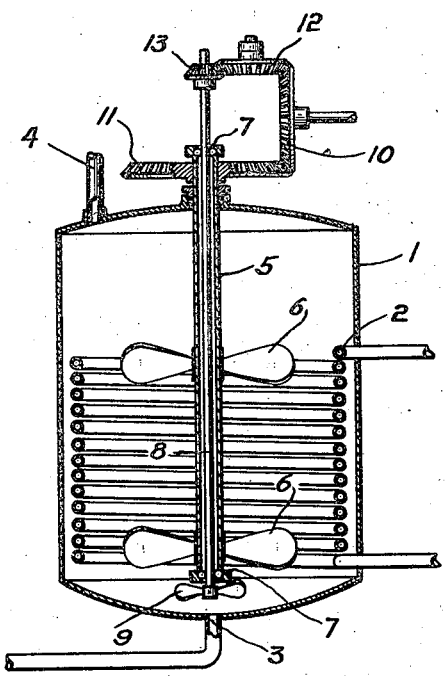
Alfred A. Wells
INVENTOR.
WITNESSES:

UNITED STATES PATENT OFFICE.

ALFRED A. WELLS, OF MONTCLAIR, NEW JERSEY.

OIL-HARDENING PROCESS.

1,383,887.   Specification of Letters Patent.   Patented July 5, 1921.

Application filed January 11, 1918. Serial No. 211,338.

*To all whom it may concern:*

Be it known that I, ALFRED A. WELLS, a citizen of the United States, and a resident of Montclair, in the county of Essex and State of New Jersey, have invented certain new and useful Improvements in Oil-Hardening Processes, of which the following is a specification.

This invention relates to the process of hydrogenating oils and to apparatus adapted for carrying out such process and relates especially to a method of passing hydrogen and oil-containing catalyzer into satisfactory contact to secure a highly efficient rate of hydrogenation.

The invention is clearly shown in the accompanying drawing which depicts in vertical section an apparatus which may be used in carrying out the invention in its preferred form.

In the drawing 1 is a tank or receptacle having a heating coil 2, a drawoff 3, an inlet pipe 4 and a stirring mechanism 5 with blade 6. 7 is a stuffing box or gland. The stirring shaft 5 is made hollow and carries the inner shaft 8, which operates concentric with the outer shaft. At the bottom of this shaft is a stirring device or propeller 9. The apparatus is driven by means of the bevel gears 10, 11, 12 and 13. An outlet for the drawing off of oil may be provided at the bottom of the tank. In the operation of this apparatus to carry out the process of the present invention, oil mixed with a small percentage of catalyzer, as for example, one-tenth of one per cent. of palladium black or sponge, or one-half to one per cent., or so, of nickel powder, is charged into the tank 1, filling it above the height of the upper paddle 6. The oil is heated to bring it to the reacting temperature, which in the case of nickel catalyzer, will be 200° C. During the heating the oil is gently agitated which accelerates the transmission of heat. When the oil has reached a temperature of 150°, or so, hydrogen gas is introduced through the pipe 3 and passes upwardly through the oil. The propeller 9 is operated at a high rate of speed and being placed directly above the hydrogen inlet has the effect of breaking up the hydrogen stream into a series of minute bubbles which are swirled through the oil by the large blade 6. The latter paddles run relatively slowly. The hydrogen stream is reduced to fine globules which spread throughout the oil in an effective manner. The power required to stir the oil at a rate of speed sufficient to break up the hydrogen stream would be excessive and far greater than that required to keep the oil in gentle motion sufficient to allow the proper transmission of heat and to mix the hydrogen and catalyzer. With the present apparatus, however, only a relatively small amount of power is required as the hydrogen stream is broken up in such an effective way by the high speed small paddle which requires but little power that the large paddles are used simply to give the oil a swirling motion so as to allow of a slow transit of the hydrogen bubbles from the bottom to the top of the oil. Besides saving in power, wear and tear on the apparatus is also reduced.

The invention may take various forms, the general theme thereof being the introduction of hydrogen into a body of an oil, such for example, as corn, cottonseed, peanut, castor, cocoanut or other vegetable oil, or any suitable animal oil, the hydrogen being reduced to fine portions or globules by a stirring device operating at a relatively high speed, adjacent to the hydrogen inlet and the oil being given a relatively gentle swirling motion by means of stirrers operating at a relatively slow rate of speed.

After the oil has been hardened it is run out of the tank either through the hydrogen inlet pipe 3, or through an outlet at the bottom of the tank, which is not shown in the present drawing. It is needless to say the pipes 3 and 4 are provided with spray valves which are not shown in the drawing for sake of simplicity. The same observation applies to the inlet and outlet pipes for oil or water as the case may be.

In carrying out the hardening operation with nickel catalyzer, a temperature as stated, of 200° C., is preferably used, when hardening, for example, cottonseed oil. For best results deodorized cottonseed oil is used and this may be withdrawn from the deodorizer while heated and run directly into the hydrogenation tank if desired. The deodorizing is preferably carried out under reduced atmospheric pressure, as for example, at a sub-atmospheric pressure of twenty-nine inches. The temperature of deodorization may vary usually between 200 and 250° C. After the oil is brought into the tank directly from the deodorizer there is some saving in fuel and time required for heating. In carrying out the process I preferably use catalytic material prepared from nickel formate. Thus heated with oil, as for example, cottonseed oil in a closed receptacle provided with a stirrer, the temperature employed being about 240-250° C., the heating is carried out for about two or three hours and a somewhat concentrated catalyzer is obtained, preferably three to five per cent. of nickel being obtained in this way suspended in the oil which owing to the sustained temperature during the period of decomposition is usually slightly darkened and impaired in flavor. This oil is filtered off, thereby collecting the catalyzer in the form of cakes and the oil obtained in this manner may be again pressed and deodorized and subsequently may be hydrogenated. The catalyzer is added to the oil from the deodorizer making up a mixture ranging from one to two per cent. of nickel. Of course, other proportions of nickel may be employed, but preferably in the hardening operation, I employ one per cent. of nickel powder. If the catalyzer is quite active, there will be a development of heat on the introduction of hydrogen and the temperature will rise. This heating, etc., may be counteracted by the introduction of cold or slightly warmed water. The hydrogen which passes through the tank unabsorbed by the oil may be collected and passed through water and alkali purifiers and collected in a gas holder to be again used. Preferably I pass the gases coming from the hydrogenating tank into an oil trap, then into a saline solution, preferably a solution of sodium acetate of about ten per cent. strength and finally into a solution of caustic soda containing potassium permanganate.

When the oil has been hardened it is run off from the hydrogenator and passed through a filter press. In order to afford improved filtration, a quantity of silica or silex or clay particles coated with hydrated silica may be used. This material may be mixed with the nickel and introduced into the hardening tank along with the oil. One or two pounds of the silica may be used per pound of nickel powder. After filtration of the oil, the latter may require deodorization as the hydrogenation process sometimes gives a slight odor to the oil which can be removed by deodorization under reduced atmospheric pressure in like manner as previously indicated. After deodorization if any impurities or flocculated material are observed in the oil, the latter may be put through a filter press to brighten it. In some cases this filter press may be prepared by depositing a thin layer of fullers' earth on the filter cloths before introducing the deodorized hardened fat. The clear filtered fat may then be cooled, preferably without contact with air and then is made up into lard compound or sold as hard fat depending upon the quality and melting point of the fat which has been produced.

What I claim is:—

1. The process of hardening animal and vegetable oils, which comprises passing a stream of hydrogen from beneath into a body of the oil containing finely-divided nickel, violently stirring the oil at the point of entry of the hydrogen stream, whereby the hydrogen is disseminated in the form of fine globules throughout the oil, giving the oil a relatively slow swirling motion throughout its entire body, while the hydrogen globules are moving upwardly through said body of oil.

2. The process of hardening animal and vegetable oils, which comprises passing a stream of hydrogen from beneath into a body of the oil containing about 1% of nickel catalyzer, in violently stirring the oil at the point of entry of the hydrogen stream, whereby the hydrogen is disseminated in the form of fine globules throughout the oil, in giving the oil a relatively slow swirling motion throughout its entire body, while the hydrogen globules are moving upwardly through said body of oil.

ALFRED A. WELLS.